US012676078B2

(12) United States Patent
Ji et al.

(10) Patent No.: US 12,676,078 B2
(45) Date of Patent: *Jul. 7, 2026

(54) VIRTUAL MEETING COACHING WITH DYNAMICALLY EXTRACTED CONTENT

(71) Applicant: Zoom Communications, Inc., San Jose, CA (US)

(72) Inventors: Wei Ji, San Jose, CA (US); Bilung Lee, San Jose, CA (US); Vijay Parthasarathy, San Jose, CA (US); David Dharmendran Rajkumar, San Jose, CA (US); Mark Yacovone, Dallas, TX (US)

(73) Assignee: Zoom Communications, Inc., San Jose, CA (US)

( * ) Notice: Subject to any disclaimer, the term of this patent is extended or adjusted under 35 U.S.C. 154(b) by 507 days.

This patent is subject to a terminal disclaimer.

(21) Appl. No.: 18/104,179

(22) Filed: Jan. 31, 2023

(65) Prior Publication Data

US 2024/0153398 A1 May 9, 2024

Related U.S. Application Data

(60) Provisional application No. 63/423,491, filed on Nov. 7, 2022.

(51) Int. Cl.
*G09B 7/02* (2006.01)
*G06F 40/279* (2020.01)
*G06Q 10/0639* (2023.01)
(52) U.S. Cl.
CPC ............. *G09B 7/02* (2013.01); *G06F 40/279* (2020.01); *G06Q 10/06393* (2013.01)

(58) Field of Classification Search
CPC ....................................................... G09B 7/02
See application file for complete search history.

(56) References Cited

U.S. PATENT DOCUMENTS

| | | |
|---|---|---|
| 2008/0254425 A1 | 10/2008 | Cohen |
| 2016/0049094 A1* | 2/2016 | Gupta ...................... G09B 7/02 |
| | | 434/185 |
| 2019/0132265 A1 | 5/2019 | Nowak-Przygodzki et al. |
| 2022/0343899 A1 | 10/2022 | Reece et al. |

OTHER PUBLICATIONS

International Search Report and Written Opinion mailed on Feb. 15, 2024 in corresponding PCT Application No. PCT/US2023/036603.

* cited by examiner

*Primary Examiner* — Thomas J Hong

(57) ABSTRACT

Methods and systems provide for virtual meeting coaching with dynamically extracted content. In one embodiment, the system receives transcripts for a plurality of selected meetings from within a communication platform, the meetings being selected for question extraction; extracts, via a question extraction model, questions from the transcripts for the selected meetings; extracts, from the questions, a number of expected answers, each expected answer associated with one of the questions; connects to a coaching session with one or more participants and a virtual coaching agent; transmits, by the virtual coaching agent, at least a subset of the extracted questions to the participants; receives answers to the subset of the extracted questions by participants; and generates one or more evaluation scores for the participants corresponding to each of the answers, the evaluation scores being based at least in part on the extracted expected answers associated with the subset of the extracted questions.

20 Claims, 11 Drawing Sheets

150

102

PROCESSING ENGINE

RECEIVING MODULE
152

QUESTION EXTRACTION
MODULE
154

ANSWER EXTRACTION
MODULE
156

CONNECTING MODULE
158

QUESTION MODULE
160

ANSWER MODULE
162

EVALUATION MODULE
164

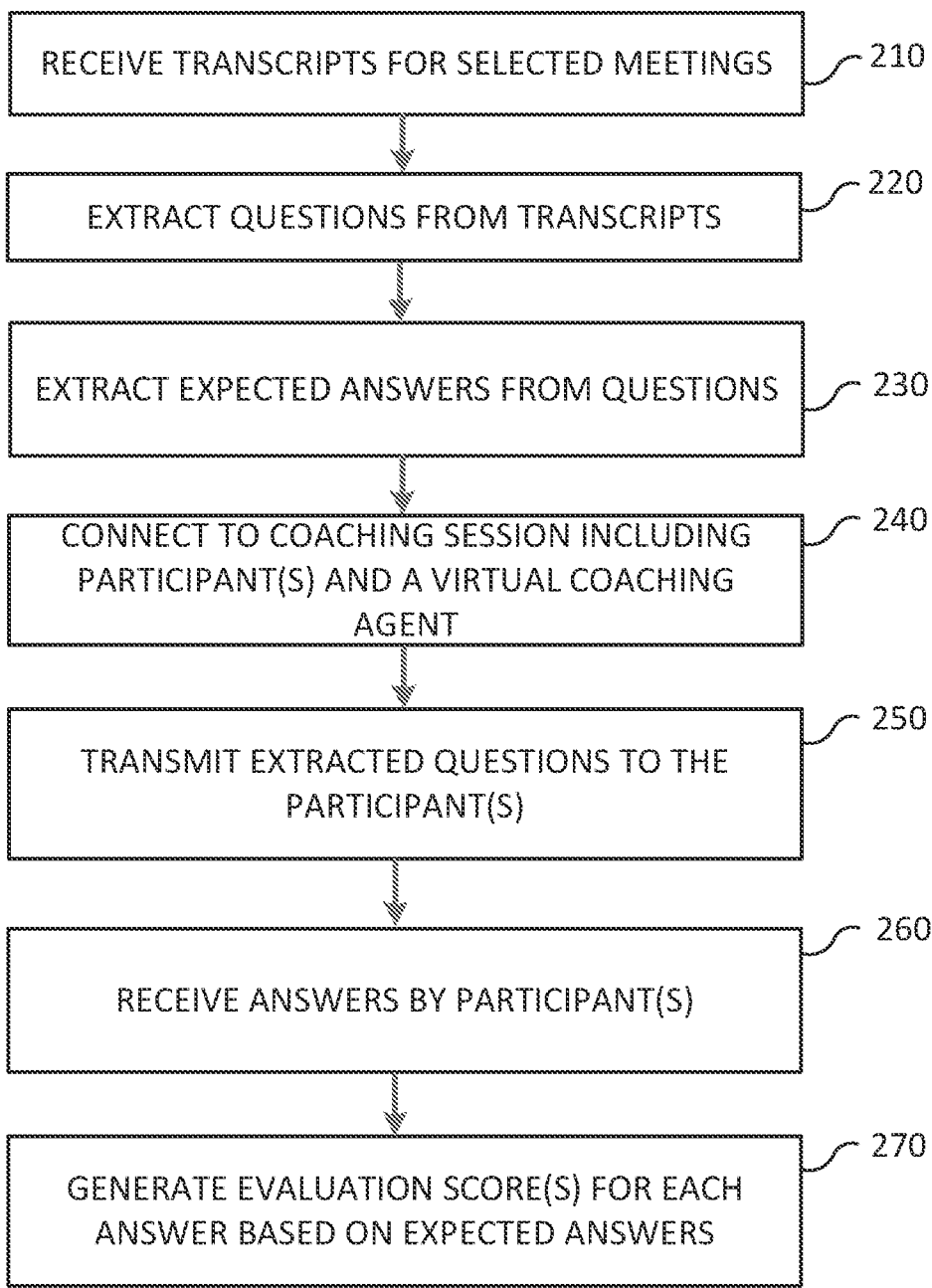

RECEIVE TRANSCRIPTS FOR SELECTED MEETINGS — 210

EXTRACT QUESTIONS FROM TRANSCRIPTS — 220

EXTRACT EXPECTED ANSWERS FROM QUESTIONS — 230

CONNECT TO COACHING SESSION INCLUDING PARTICIPANT(S) AND A VIRTUAL COACHING AGENT — 240

TRANSMIT EXTRACTED QUESTIONS TO THE PARTICIPANT(S) — 250

RECEIVE ANSWERS BY PARTICIPANT(S) — 260

GENERATE EVALUATION SCORE(S) FOR EACH ANSWER BASED ON EXPECTED ANSWERS — 270

FIG. 2

Filler words (words/min):    4.2

Talk speed (words/min):    192

Sentence length (words/sent):    16

Content evaluation:

conversational intelligence platform    0.72 actionable insights    0.2 performance improvement    0.7 better customer experiences    0.85

Overall coverage    0.75

340

350

330

I finished this coaching

I finished this talk

320

310

Live camera of the user (salesperson)

Question: What is Brainy for Sales?

| Expected Answer | Headline | Conversation |
|---|---|---|
| 1 | sales intelligence | Brainy is a platform for providing sales intelligence. |
| 2 | actionable insights | Brainy can generate actionable insights on potential clients. |
| 3 | performance improvement | Brainy improves performance by helping sales teams learn more about potential clients. |
| 4 | better client experiences | Brainy can deliver better experiences for clients. |

Answer from Salesperson: Brainy provides overall analytics for potential customers. It will help your sales team to find current weaknesses in your sales approach. Brainy for Sales integrates with the Sales Evaluation tool. It can help your sales team to get key point analytics based on customer interactions. Such functions can help sales to find their weaknesses and strengths based on AI evaluation. It can also be applied to other teams, like marketing.

FIG. 4

VIRTUAL MEETING COACHING WITH DYNAMICALLY EXTRACTED CONTENT

FIELD OF INVENTION

The present invention relates generally to digital communication, and more particularly, to systems and methods for providing virtual meeting coaching with dynamically extracted content.

SUMMARY

The appended claims may serve as a summary of this application.

BRIEF DESCRIPTION OF THE DRAWINGS

The present invention relates generally to digital communication, and more particularly, to systems and methods for providing virtual meeting coaching with dynamically extracted content.

The present disclosure will become better understood from the detailed description and the drawings, wherein:

FIG. 2 is a flow chart illustrating an exemplary method that may be performed in some embodiments.

FIG. 4 is a diagram illustrating an example of an extracted question with extracted expected answers, as well as an answer from a participant, in accordance with some embodiments.

DETAILED DESCRIPTION

Figure 1A:
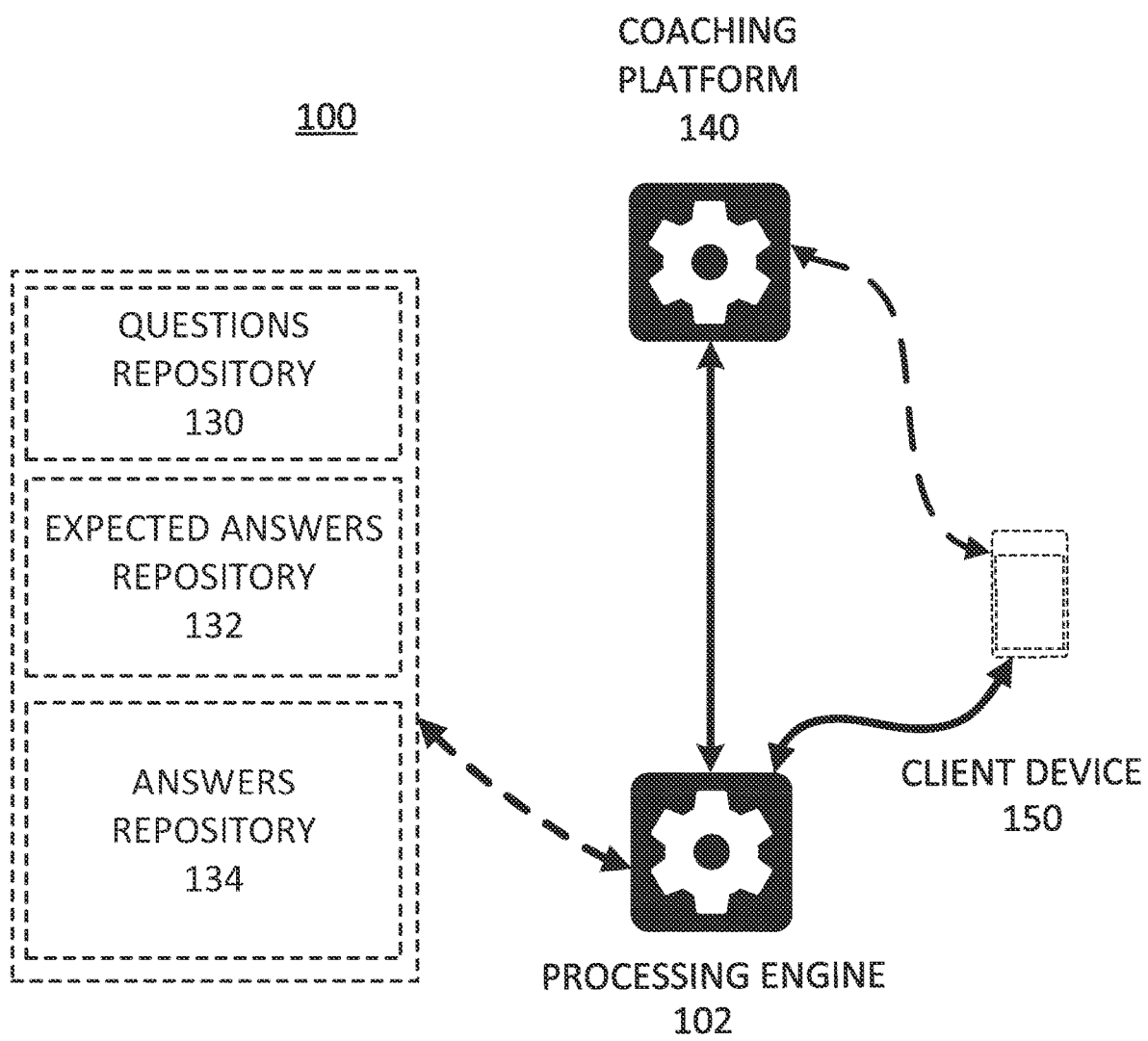
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Digital communication tools and platforms have been essential in providing the ability for people and organizations to communicate and collaborate remotely, e.g., over the internet. In particular, there has been massive adopted use of video coaching platforms allowing for remote video sessions between multiple participants. Video communications applications for casual friendly conversation ("chat"), webinars, large group meetings, work meetings or gatherings, asynchronous work or personal conversation, and more have exploded in popularity.

With the ubiquity and pervasiveness of remote communication sessions, a large amount of important work for organizations gets conducted through them in various ways. For example, a large portion or even the entirety of sales meetings, including pitches to prospective clients and customers, may be conducted during remote communication sessions rather than in-person meetings. Sales teams will often dissect and analyze such sales meetings with prospective customers after they are conducted. Because sales meetings may be recorded, it is often common for a sales team to share meeting recordings between team members in order to analyze and discuss how the team can improve their sales presentation skills.

Such techniques are educational and useful, and can lead to drastically improved sales performance results for a sales team. However, such recordings of meetings simply include the content of the meeting, and the communications platforms which host the meetings do not provide the sorts of post-meeting, or potentially in-meeting, intelligence and analytics that such a sales team would find highly relevant and useful to their needs.

In particular, sales teams may wish to improve their performance during meetings by partaking in training, coaching, or practice sessions. While there are online training courses aimed at teaching sales teams how to, e.g., improve their sales pitch, communication skills, answering of client questions, and more, such courses are for learning skills and receiving advice, tips, or fundamental knowledge for how to approach meetings with potential customers. However, there is a lack of coaching sessions for meetings which are practice-oriented in nature. That is, rather than accruing new knowledge, such coaching sessions enable a participant to practice their skills during a practice meeting with a virtual coach or virtual agent, where questions are asked by the coach or agent which are representative of questions the participant can expect to be asked during a typical meeting with a prospective customer. Such coaching sessions would allow the participant to provide an answer to such questions, and these answers would be evaluated based on a number of metrics. An overall performance score or review would then be provided at the end of the session. Coaching sessions would be highly useful and relevant to sales teams looking to improve their sales and communication skills and increase their likelihood of success with prospective customers during sales meetings.

Thus, there is a need in the field of digital communication tools and platforms to create a new and useful system and method for providing virtual meeting coaching with dynamically extracted content. The source of the problem, as discovered by the inventors, is a lack of ability to provide a virtual coaching agent with a number of dynamically extracted questions to ask participant(s), and a lack of ability to evaluate answers to those questions from the participant(s) based on dynamically extracted expected answers.

In one embodiment, the system receives transcripts for a plurality of selected meetings from within a communication platform, the meetings being selected for question extraction; extracts, via a question extraction model, questions from the transcripts for the selected meetings; extracts, from the questions, a number of expected answers, each expected answer associated with one of the questions; connects to a coaching session with one or more participants and a virtual coaching agent; transmits, by the virtual coaching agent, at least a subset of the extracted questions to the participants; receives answers to the subset of the extracted questions by participants; and generates one or more evaluation scores for the participants corresponding to each of the answers, the evaluation scores being based at least in part on the extracted expected answers associated with the subset of the extracted questions.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a coaching platform 140. The processing engine 102 is connected to the coaching platform 140, and optionally connected to one or more repositories and/or databases, including, e.g., a questions repository 130, an expected answers repository 132, and/or an answers repository 134. One or more of the databases may be combined or split into multiple databases. The user's client device 150 in this environment may be a computer, and the coaching platform 140 and processing engine 102 may be applications or software hosted on a computer or multiple computers which are communicatively coupled via remote server or locally.

The exemplary environment 100 is illustrated with only one client device, one processing engine, and one coaching platform, though in practice there may be more or fewer additional client devices, processing engines, and/or coaching platforms. In some embodiments, the client device(s), processing engine, and/or coaching platform may be part of the same computer or device.

In an embodiment, the processing engine 102 may perform the exemplary method of FIG. 2 or other method herein and, as a result, provide virtual meeting coaching with dynamically extracted content. In some embodiments, this may be accomplished via communication with the client device, processing engine, coaching platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device(s) 150 are devices with a display configured to present information to a user of the device who is a participant of the video coaching session. In some embodiments, each client device presents information in the form of a visual UI with multiple selectable UI elements or components. In some embodiments, a client device 150 is configured to send and receive signals and/or information to the processing engine 102 and/or coaching platform 140. In some embodiments, a client device is a computing device capable of hosting and executing one or more applications or other programs capable of sending and/or receiving information. In some embodiments, a client device may be a computer desktop or laptop, mobile phone, virtual assistant, virtual reality or augmented reality device, wearable, or any other suitable device capable of sending and receiving information. In some embodiments, the processing engine 102 and/or coaching platform 140 may be hosted in whole or in part as an application or web service executed on the client device 150. In some embodiments, one or more of the coaching platform 140, processing engine 102, and client device(s) 150 may be the same device. In some embodiments, a user's client device 150 is associated with a first user account within a coaching platform, and one or more additional client device(s) may be associated with additional user account(s) within the coaching platform.

In some embodiments, optional repositories can include, e.g., a questions repository 130, expected answers repository 132, and/or answers repository 134. The optional repositories function to store and/or maintain, respectively, extracted questions to be asked by a coaching agent during the coaching session; extracted expected answers associated with questions for the coaching session; and actual answers to questions provided by participants during the coaching session. The optional database(s) may also store and/or maintain any other suitable information for the processing engine 102 or coaching platform 140 to perform elements of the methods and systems herein. In some embodiments, the optional database(s) can be queried by one or more components of system 100 (e.g., by the processing engine 102), and specific stored data in the database(s) can be retrieved.

Coaching platform 140 is a platform configured to facilitate practice-oriented coaching sessions between one or more participants and a virtual coaching agent. In some embodiments, coaching platform 140 may also be configure to facilitate, e.g., meetings, presentations (e.g., video presentations) and/or any other communication between two or more parties, such as within, e.g., a video conference or virtual classroom. In some embodiments, the coaching platform 140 receives video and/or audio of at least one participant to the coaching session, and provides video and/or audio of at least the virtual coaching agent during the coaching session.

Figure 1B:
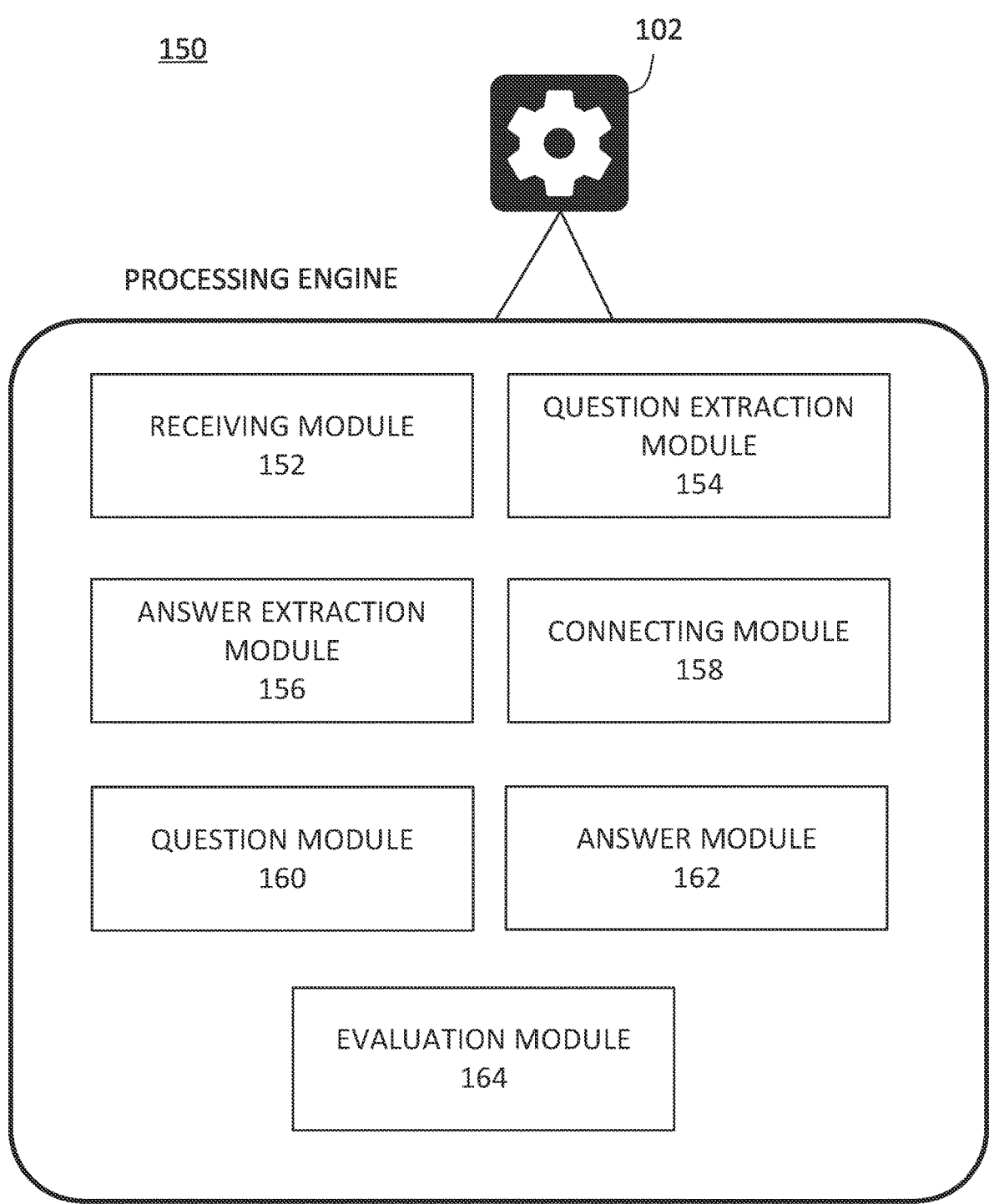
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Receiving module 152 functions to receive transcripts for a number of selected meetings from within a communication platform, the meetings being selected for question extraction.

Question extraction module 154 functions to extract, via a question extraction model, a number of questions from the transcripts for the selected meetings.

Answer extraction module 156 functions to extract, from the questions, a number of expected answers, each expected answer associated with one of the questions.

Connecting module 158 functions to connect to a coaching session including one or more participants using one or more client devices and a virtual coaching agent.

Question module 160 functions to transmit at least a subset of the extracted questions to the client device(s) used by the participant(s), the extracted questions being transmitted as uttered by the virtual coaching agent.

Answer module 162 functions to receive, from the client device, answers to the subset of the extracted questions by the participant(s).

Evaluation module 164 functions to generates one or more evaluation scores for each of the answers based at least in part on the extracted expected answers associated with the subset of the extracted questions.

The above modules and their functions will be described in further detail in relation to an exemplary method below.

FIG. 2A is a flow chart illustrating an exemplary method that may be performed in some embodiments.

At step 210, the system receives transcripts for a number of selected meetings from within a communication platform or coaching platform, the meetings being selected for question extraction. In some embodiments, a user of the communication platform or coaching platform may mark one or more existing meetings, coaching sessions, or other communication sessions as approved or otherwise selected. These meetings may be approved specifically for usage by a question extraction model or other model for extracting questions, expected answers, or other material from the meetings. In some embodiments, the system receives a list of selected or approved meetings. The system then requests and/or receives transcripts of utterances which are associated with those selected meetings, and which contain utterances from participants who had attended those selected meetings. In some embodiments, the transcripts include timestamps for beginning and ending times of utterances. In some embodiments, speaker information is included for each utterance.

At step 220, the system extracts, via a question extraction model, a number of questions from the transcripts for the selected meetings. A "question" may be any question that could potentially be asked during the course of a meeting for which coaching constitutes practicing or training for. In various embodiments, questions may take the form of, e.g., one or more words, phrases, alphanumeric characters, or any other suitable string or series of characters. In some embodiments, extracting the questions is performed via machine learning ("ML") techniques. In some embodiments, the question extraction model may involve, e.g., determining questions within the transcripts of the selected meetings which are asked by a participant of a particular organization that is then answered in the following utterance by a different participant not associated with that organization. In some embodiments, the extracted questions may be determined to contain one or more interrogative words, such as, e.g., "who", "what", "when", "where", or "how". In some embodiments, the model may determine the syntactic structure of each utterance by tagging and parsing tokens of speeches within the sentences.

At step 230, the system extracts, from the questions, a number of expected answers, each expected answer associated with one of the questions. An "expected answer" may consist of one or more key points, with each key point consisting of a headline, e.g., key word(s), a phrase, or a topic that constitutes one portion of an expected answer, and one or more conversation sentences, e.g., sentences constituting conversation that would make up a more complete utterance-level version of the portion of the expected answer. In various embodiments, expected answers may take the form of, e.g., one or more words, phrases, alphanumeric characters, or any other suitable string or series of characters. In some embodiments, extracting the expected answers is performed via ML techniques. In some embodiments, the system may extract the expected answers based on a combination of the extracted questions and their surrounding content or context within the transcripts of selected meetings. In some embodiments, extracted answers may be the utterances following extracted questions within transcripts of selected meetings.

In some embodiments, a number of expected questions, representing questions which a participant may potentially ask the virtual coaching agent, are extracted from the transcripts for the selected meetings. In some embodiments, the system may extract an answer for each of the expected questions, the answer being associated with the expected question. In some embodiments, the answers are extracted from a corpus of transcripts for communication sessions.

In some embodiments, the system extracts, from audio of the selected meetings, one or more expected tones for answers. In some embodiments, the answer from one or more of the participants may additionally include audio of the participant, and generating the one or more evaluation scores for each of the answers may be further based on comparing one or more tones from the audio of the participant in the answer to the one or more expected tones for answers.

In some embodiments, the system extracts, from video of the selected meetings, one or more expected visual expressions for answers. In some embodiments, the answer from one or more of the participants may include video of the participant, and generating the one or more evaluation scores for each of the answers is further based on comparing one or more visual expressions from the video of the participant in the answer to the one or more expected visual expressions for answers.

In some embodiments, the extracted questions and extracted expected answers together constitute one or more "scenarios" where for a particular scenario, a subset of the questions and their associated expected answers all relate to a common context. In some embodiments, a common context is determined based on the extracted questions and expected answers, with the common context relating to a subset of the questions and expected answers. The common context, for example, may be a first primary question, such as, e.g., "Why is your product so expensive?" with a series of questions related to that primary question, and a series of expected answers associated with those questions. In another example, the scenario may include a common context of "Explain the product", which includes questions asking to explain how the product is different from other products on the market, among other related questions. Such questions relating to that common context may be combined into a single scenario which makes up the set of coaching items. In some embodiments, the scenario(s) each with common context may be generated or determined by the system based on the content of the extracted questions and their associated expected answers. Such determination or generation may be performed based on, for example, using machine learning techniques to determine the scenario and/or common context given a set of extracted questions and expected answers as inputs. In some embodiments, scenarios may be predetermined or prespecified, and the common contexts for those scenarios may also be predetermined or prespecified. For example, one or more "exemplary" scenarios may be used by default.

At step 240, the system connects to a coaching session including one or more participants using one or more client devices and a virtual coaching agent.

In some embodiments, only one participant and one virtual coaching agent are included in the coaching session. In other embodiments, multiple participants may be included in the coaching session. In some embodiments, multiple coaching agent(s) may be present. In coaching sessions with multiple participants, a group session may take one of a variety of possible forms. For example, an entire sales team may be able to join a single coaching session. In some scenarios, one of the members of the sales team may answer questions while the other members observe. In other scenarios, multiple members or all of the members may answer questions, either by, e.g., taking turns answering different questions, or concurrently providing answers to the same questions. In some scenarios, one participant may answer questions, while another evaluates the first participant, such as in a supervisor and trainee scenario. In another example, a marketing team and technical team can join together to participate in a group coaching session. In some embodiments, it might be possible for anyone from any of the teams to answer a question.

In some embodiments, at least one of the participants of the coaching session may be assigned to the coaching session by a user of the communication platform authorized to assign coaching sessions to the participant. For example, a supervisor may assign a coaching session to a trainee, and invite the trainee to that coaching session. In some embodiments, at least one of the participants of the coaching session may be assigned to the coaching session automatically based on a performance by the participant within one or more communication sessions previously attended by the participant. For example, if the system determines that a particular participant did not answer a question from a real prospective customer in a sales call adequately, then the system may assign the coaching session to that participant in order to help the participant improve on sales calls.

In some embodiments, the virtual coaching agent is represented in video by a digital avatar. The digital avatar may be shown visually as, for example, a generated video image in the likeness of a person, a static image in the likeness of a person, or any other suitable visual representation of a digital avatar.

In some embodiments, the digital avatar is triggered based on vocal speech generated for the virtual coaching agent. That is, based on receiving audio representing vocal speech of the virtual coaching agent, a digital avatar for the virtual coaching agent can be generated to match the received audio in various ways. For example, lips of the digital avatar can be shown to move to match the vocalizations from the audio for the virtual coaching agent.

In some embodiments, the virtual coaching agent is represented in audio by vocal speech generated via text-to-speech (TTS) techniques. For example, if a question in text has been received as intended to be vocalized by a virtual coaching agent, the text question can be converted to speech via TTS techniques. In some embodiments, the speech can then be used to generate a voice-triggered digital avatar in video form.

In some embodiments, the coaching session can be hosted or maintained on a coaching platform or a communication platform, which the system maintains a connection to in order to connect to the coaching session. In some embodiments, the system displays a UI for each of the participants in the coaching session. The UI can include one or more participant windows or participant elements corresponding to video feeds, audio feeds, chat messages, or other aspects of communication from the participant or virtual coaching agent within the coaching session.

At step 250, the system transmits at least a subset of the extracted questions to the client device(s) used by the participant(s), the extracted questions being transmitted as uttered by the virtual coaching agent. In some embodiments, for each of one or more questions, the system transmits the question to the client device(s) used by the participant(s), the question being transmitted as uttered by the virtual coaching agent. In some embodiments, the utterance of each question by the virtual coaching agent may be received as, e.g., an audio utterance, such as a vocalization or synthesized speech.

At step 260, the system receives, from the client device, answers to the subset of the extracted questions by the participant(s). In some embodiments, for each of one or more questions, the system receives, from the client device, an answer to the question by at least one of the participants, the answer including audio of the answering participant. In some embodiments, the answer can further include video of the answering participant. In various embodiments, the answering participant can transmit, via their client device, audio output, video output, or both during the coaching session. In some embodiments, aspects of audio output from the answering participant, such as detected speech, can be received as part of the answer. In various embodiments, aspects of video output from the participant, such as detected moving of lips, gestures, expressions, eye contact, or other visual aspects of the participant during the coaching session can be received as part of the answer. In some embodiments, the answer can include text, presentation slides, chat messages, or other suitable aspects of a presentation or meeting.

In some embodiments, the system receives text of utterances spoken by the answering participant during each answer.

In some embodiments, the answer from the answering participant which was produced during the coaching session is used to generate utterances which are received in real time during the coaching session. The utterances are either generated by the system, or generated elsewhere and retrieved by the system for use in the present systems and methods. In some embodiments, the utterances are textual in nature. In some embodiments, the utterances are composed of one or more sentences attached to a specific speaker of that sentence (i.e., participant). Timestamps may be attached to each utterance and/or each sentence. In some embodiments, the utterances are generated in real-time while the coaching session is underway. In other embodiments, the utterances are generated in real-time during the session and also presented in real-time during the session. In some embodiments, automatic speech recognition ("ASR") techniques are used in whole or in part for generating the transcript. In some embodiments, machine learning ("ML") or other artificial intelligence ("AI") models may be used in whole or in part to generate the utterances or transcript. In some embodiments, natural language processing ("NLP") techniques may be used in whole or in part to generate the utterances or transcript.

In some embodiments, audio from the answering participant may be received in real time while the utterances are still being generated. For example, the transcribed utterances may still be in the process of being generated as the coaching session is underway, with utterances spoken by the participants being added to the utterances in real time. The text may also be continually received as this process occurs, such that the system periodically receives updates to the text while the meeting is occurring.

At step 270, the system generates one or more evaluation scores for each of the answers based at least in part on the extracted expected answers associated with the subset of the extracted questions. In some embodiments, generating the one or more evaluation scores for each of the answers is further based at least in part on comparing the extracted expected answers associated with the subset of the extracted questions to the utterances for the received answer. In some embodiments, such content-based evaluation scores can be generated based on the content of the utterances made by the participant during their formulation of the answer. In some embodiments, the evaluation scores are generated via text embedding, wherein the utterances are embedded as words and/or sentences, then those embeddings are compared to an expected answer associated with the question to evaluate how similar they are, then an evaluation score is generated to represent that similarity. In some embodiments, percentage of content coverage of the expected answer, e.g., the headlines and/or conversation sentences of key points within the expected answer, may be represented within a generated evaluation score. In some embodiments, evaluating the content includes comparing the utterances of the answer to the text of the expected answer associated with the question to determine a coverage of the answer, wherein at least one of the evaluation scores is generated based on the coverage of the answer.

In some embodiments, the generated evaluation score may take the form of a numerical score. For example, the score may be, e.g., a percentage representing the amount of expected answer content was detected within the participant's answer. In another example, the evaluation score may be a letter grade such as, e.g., A or B+. In some embodiments, evaluation scores may be adjusted upward or downward based on a length of time the participant spent in answering the question.

In some embodiments, generating the one or more evaluation scores for the answer to the question is further based on evaluating the style of the answer to the question from the answering participant. In some embodiments, evaluating the style of the answer to the question includes evaluating the tone of the participant's speech from the audio. The participant's voice may include tonal aspects which can be measured and evaluated, such as, e.g., a high pitch, low pitch, a rise or fall in dynamics or amplitude, quiet vocal aspects, loud vocal aspects, or any other suitable tonal aspects which may constitute a tonal style which may be evaluated. In some embodiments, the tonal style is compared to one or more expected or optimal tonal styles in order to generate one or more evaluation scores.

In some embodiments, evaluating the style of the answer to the question includes evaluating the visual expression of the answering participant from video. Visual expression of the participant detected from video output of the participant can include, for example, facial expressions of the participant, gestures, eye contact (such as eye contact toward the camera or away from the camera), lip movements, and more. In some embodiments, the visual expressions are compared to one or more expected or optimal visual expressions in order to generate one or more evaluation scores.

In some embodiments, generating the one or more evaluation scores for the answer to the question includes generating an evaluation score for an average number of filler words within a designated window of time. Filler words may be words which constitute a pause or gap in substantive content within an utterance, such as, for example, "um", "uh", or "like" in some contexts. In some embodiments, generating the one or more evaluation scores for the answer to the question includes generating an evaluation score for an average talk speed of the participant. In some embodiments, generating the one or more evaluation scores for the answer to the question includes generating an evaluation score for an average sentence length of utterances by the participant. In some embodiments, generating the one or more evaluation scores for the answer to the question includes generating an evaluation score for a talk-listen ratio of the participant. In some embodiments, generating the one or more evaluation scores for the answer to the question includes generating an evaluation score for a longest sentence uttered by the participant. In some embodiments, generating the one or more evaluation scores for the answer to the question includes generating an evaluation score for an amount of speaker interruptions by the participant.

In some embodiments, the system transmits a next question to the client device upon the current question being completed. In some embodiments, prior to transmitting a next question to one of the client devices, the system determines that the answer to the question by an answering participant associated with that client device has terminated. In some embodiments, the system determining that the answer has terminated includes receiving a signal that the participant has interacted with a user interface element for marking the answer as completed. For example, the user may click or tap a button marked, "Finish my answer". In some embodiments, the system determines that the answer has terminated via one or more ML techniques.

In some embodiments, determining that the answer has terminated includes detecting a pause in the speech of the answering participant beyond a specified pause threshold, such as, e.g., 2 seconds. In some embodiments, determining that the answer has terminated further comprises detecting a segmentation boundary mark for a sentence uttered by the participant as part of the answer.

In some embodiments, at least one of the participants can ask a question to the virtual coaching agent, and the virtual coaching agent can respond with an answer. In some embodiments, the system receives, from the client device, a question from the participant to the virtual coaching agent. The system then determines a similarity match of the question from the participant to an expected question from a set of expected questions, each expected question being associated with an answer. The system then transmits, to the client device, the answer associated with the expected question, the answer being transmitted as uttered by the virtual coaching agent.

In some embodiments, the system determines that there is no similarity match of the question from the participant to any expected questions from a set of expected questions. The system then transmits, to the client device, a "canned"

answer from a set of one or more canned answers to unexpected questions, the canned answer being transmitted as uttered by the virtual coaching agent.

In some embodiments, the system transmits, to at least the client device, an overall evaluation score for one or more answering participant(s) within the coaching session, the score being determined based on the generated evaluation scores for the questions. In some embodiments, the overall evaluation score is generated as the weighted average of the one or more generated evaluation scores, wherein each of the generated evaluation scores is assigned a predetermined weight. In some embodiments, prior to transmitting the overall evaluation score for the coaching session, the system receives a signal that the participant has interacted with a UI element for marking the coaching session as completed.

Figure 3:
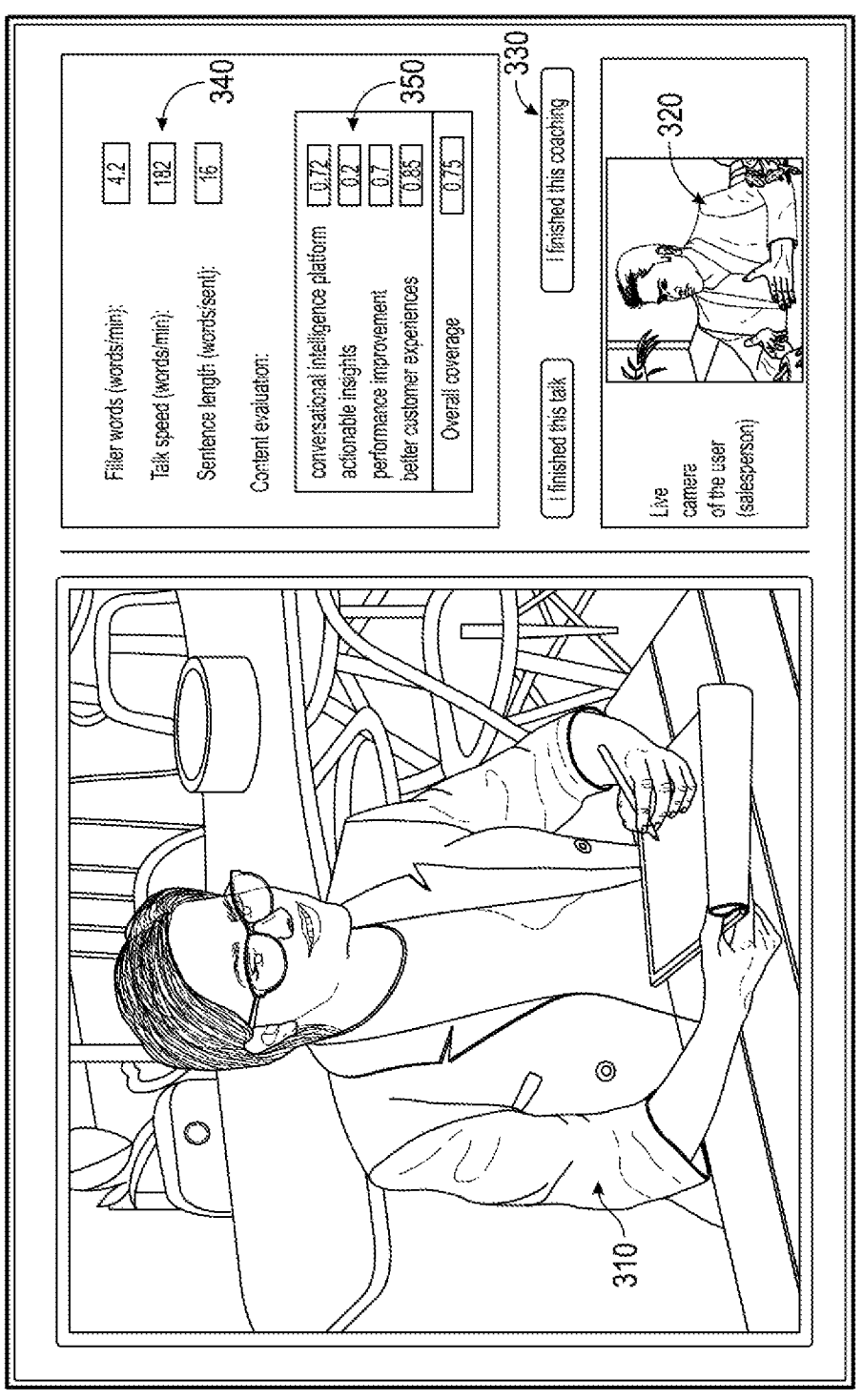
FIG. 3 is a diagram illustrating an example of a user interface for a coaching session with dynamically extracted content, in accordance with some embodiments.

FIG. 3 is a diagram illustrating an example of a user interface for a coaching session with dynamically extracted content, in accordance with some embodiments. Within the user interface, video of a virtual coaching agent 310 is displayed on the left, while a video stream of the participant 320 is displayed on the right, representing live camera output of the participant, who is a salesperson. User interface elements 330 appear above this video output, including a button marked "I finished this talk" to represent that an answer is completed, and a button marked "I finished this coaching" to represent that a coaching session is finished. In a frame at the top right of the user interface, evaluation scores are displayed for style and content regarding a particular question that has been asked. Number of filler words per minute, talk speed in words per minute, and sentence length in words are displayed, and content evaluation scores are displayed including content coverage for the expected answer headlines of "conversational intelligence platform", "actionable insights", "performance improvement", and "better customer experiences". An overall coverage score is also displayed for a particular question.

FIG. 4 is a diagram illustrating an example of an extracted question with extracted expected answers, as well as an answer from a participant, in accordance with some embodiments. An example of a question that may be extracted reads as "What is Brainy for Sales?", and an extracted expected answer consisting of 4 key points is displayed below it. The key points each have a headline (e.g., "sales intelligence") as well as one or more conversation sentences (e.g., "Brainy is a platform for providing sales intelligence.") An actual answer provided from a participant is displayed below the expected answer. The system can be configured to compare and evaluate the actual answer with respect to the expected answer's headlines and conversation statements.

Figure 5:
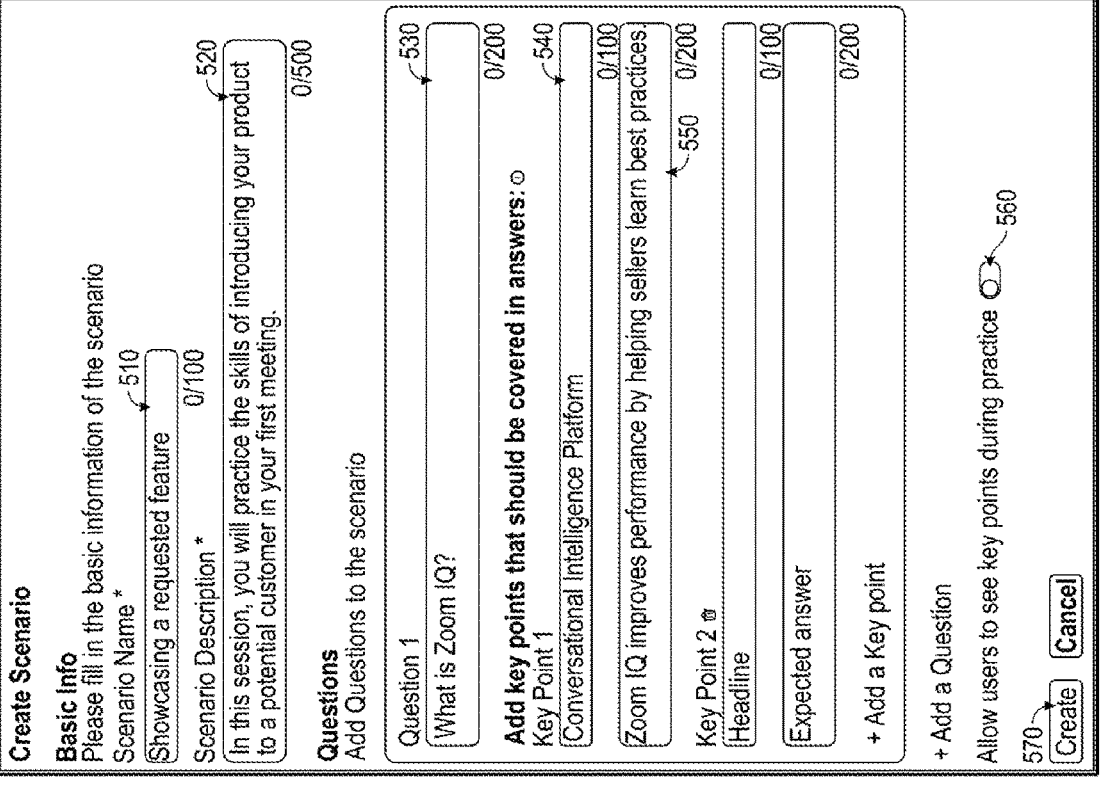
FIG. 5 is a diagram illustrating an example of a user interface for contributing to a coaching scenario with one or more provided questions and associated expected answers, in accordance with some embodiments.

FIG. 5 is a diagram illustrating an example of a user interface for contributing to a coaching scenario with one or more provided questions and associated expected answers, in accordance with some embodiments. In some embodiments, a user interface may be presented for one or more users, such as a manager of the participant of the coaching session, to manually contribute one or more questions and/or expected answers to submit to the system to be used in coaching sessions in addition to the extracted questions and extracted expected answers. A scenario name 510 is displayed, as well as a scenario description 520 with filled-in content. A first question 530 has been entered by a user, and a key point for an expected answer has been entered as well, constituting a headline 540 and one or more conversation statements 550. The user may also submit one or more additional key points and/or one or more additional questions. A toggle 560 specifies whether to allow users to see key points during the coaching session. At the bottom, the user may select a "create" button 570 to generate the question(s) and expected answer(s).

Figure 6A:
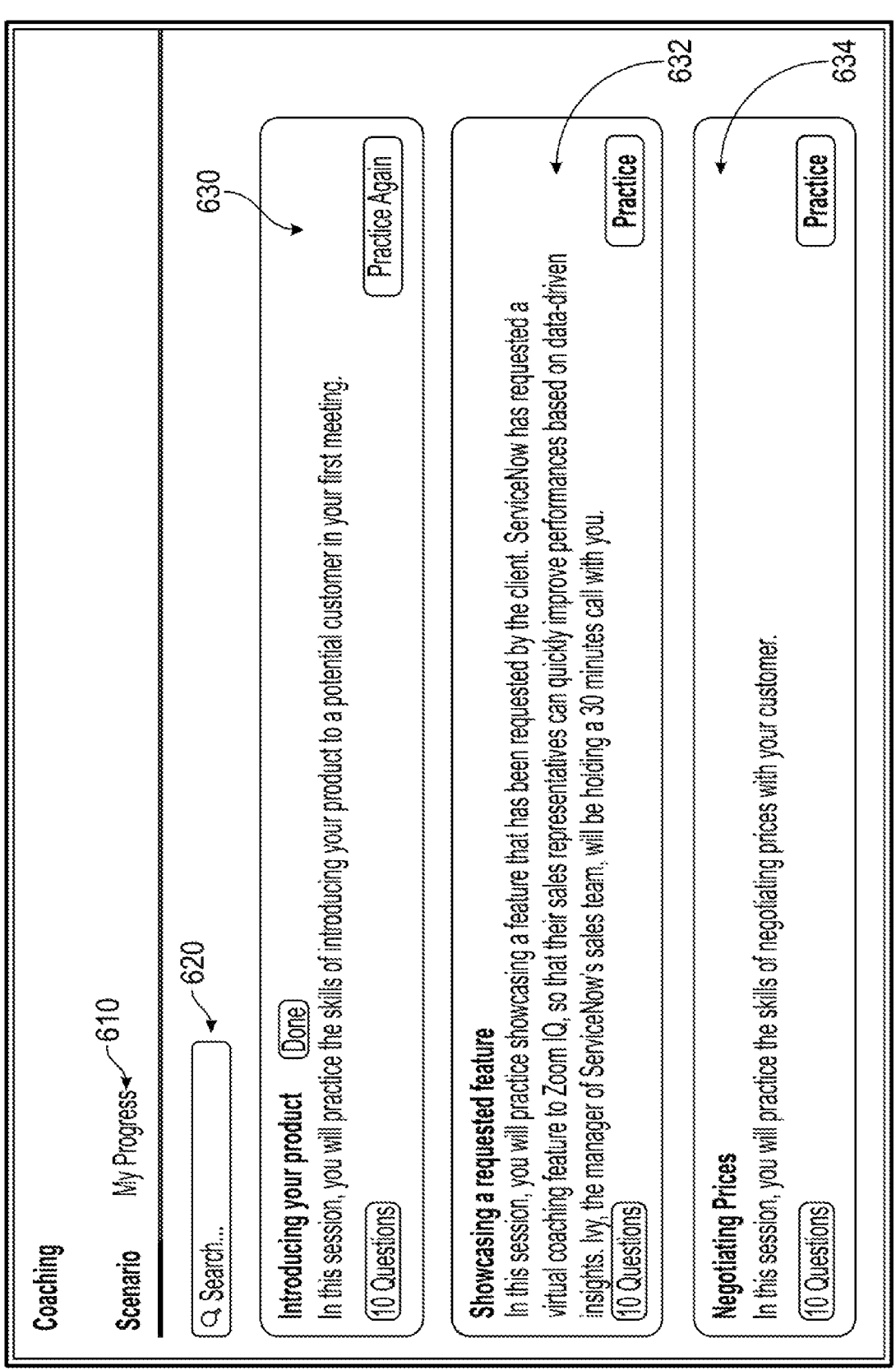
FIG. 6A is a diagram illustrating an example of a user interface for a participant to select from a number of available coaching scenarios to practice, in accordance with some embodiments.

FIG. 6A is a diagram illustrating an example of a user interface for a participant to select from a number of available coaching scenarios to practice, in accordance with some embodiments. The participant may choose between a scenario tab, for choosing from multiple coaching sessions, or a "My Progress" tab 610 for viewing their progress and performance within the platform. A search 620 may be conducted for coaching sessions. A number of available coaching sessions 630, 632, and 634 are displayed.

Figure 6B:
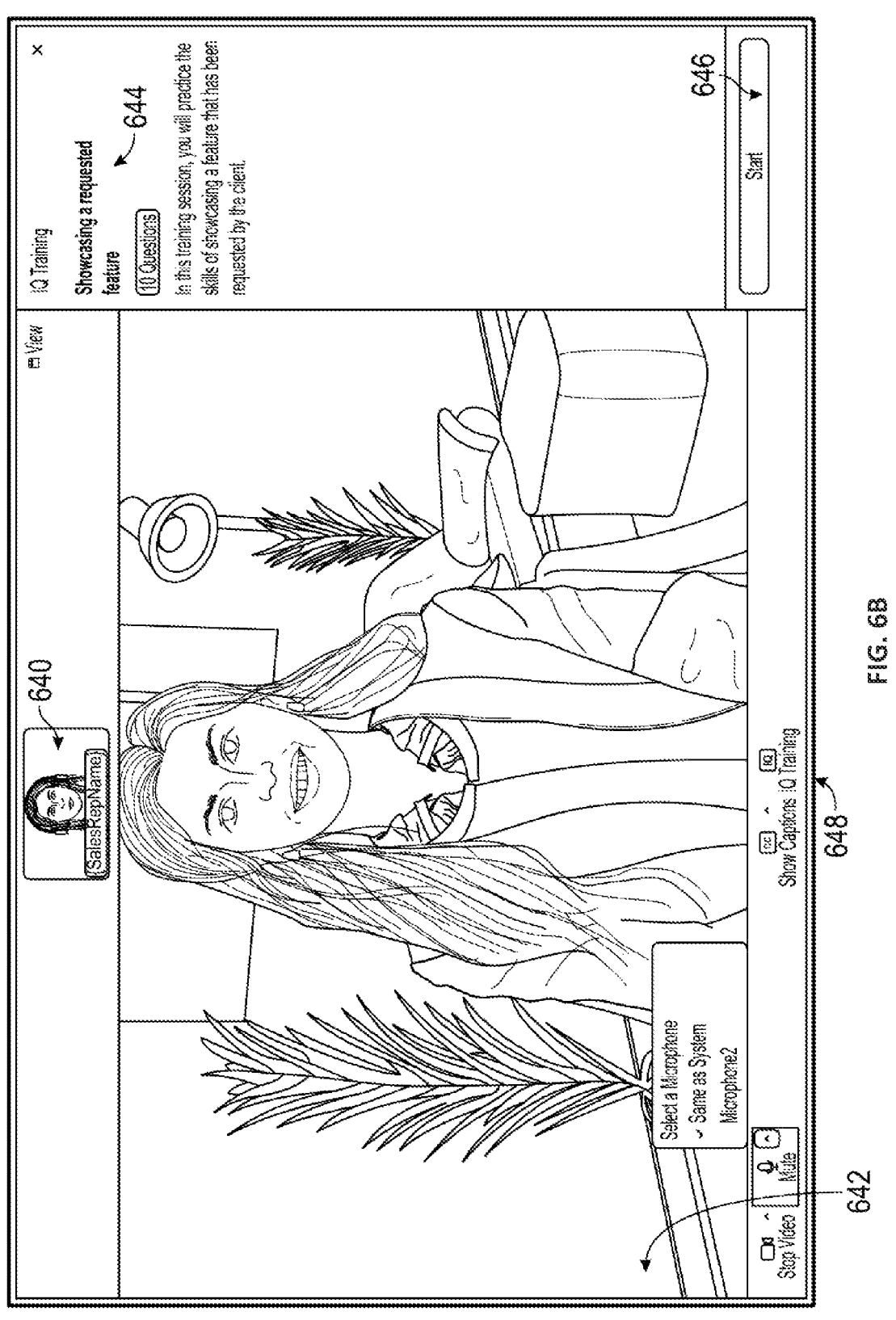
FIG. 6B is a diagram illustrating an example of a user interface representing an opening screen for a coaching session selected by a participant, in accordance with some embodiments.

FIG. 6B is a diagram illustrating an example of a user interface representing an opening screen for a coaching session selected by a participant, in accordance with some embodiments. A video output of the participant 640 is displayed, as well as a video output of a virtual coaching agent 642. The title of the coaching session 644 is displayed to the right, and below it, a button marked "Start" is provided to begin the coaching session. An "IQ training" button 648 is also displayed, which provides a separate user interface with analytics and evaluation info for coaching sessions.

Figure 6C:
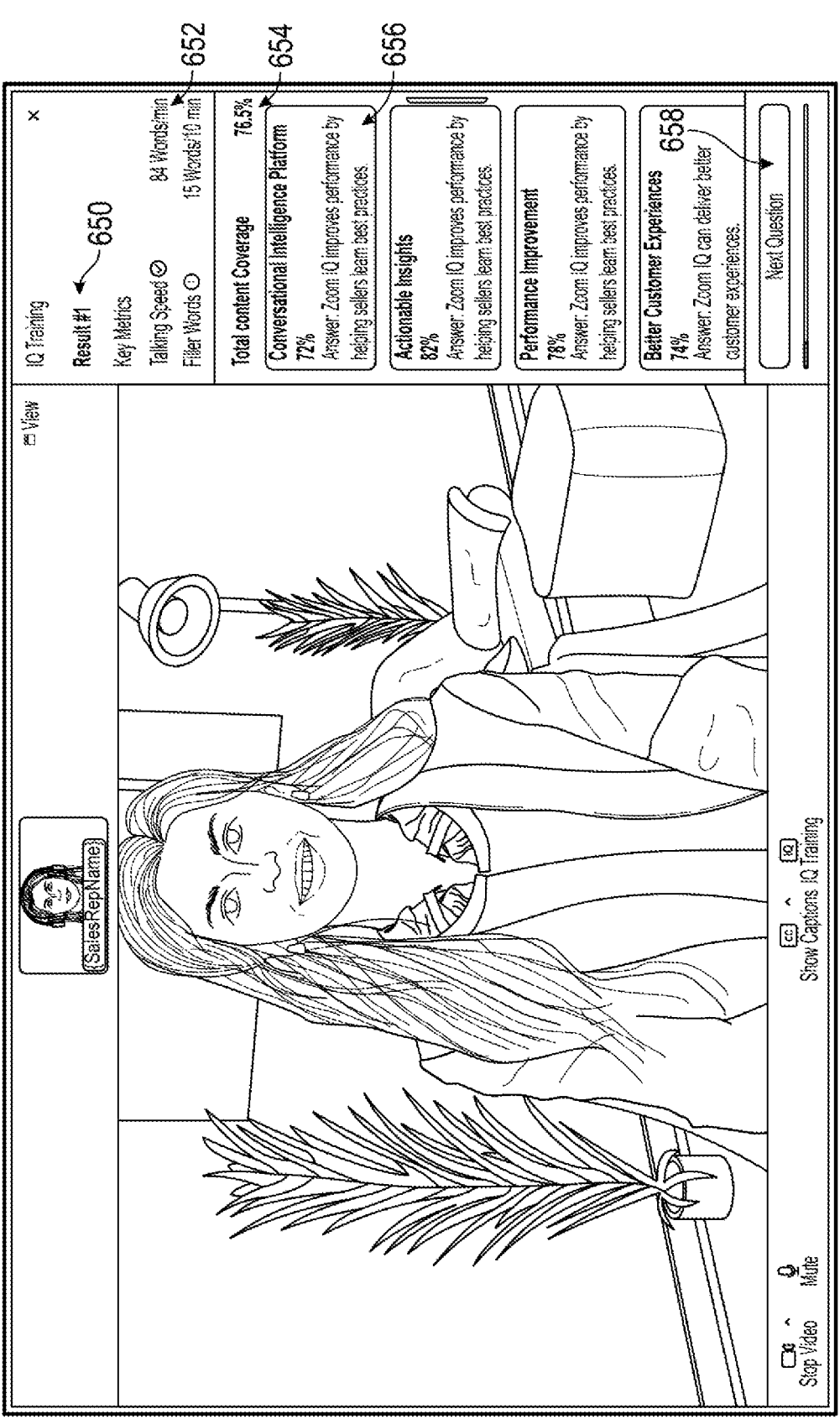
FIG. 6C is a diagram illustrating an example of a user interface representing a results screen showing evaluation results for an answer by a participant within a coaching session, in accordance with some embodiments.

FIG. 6C is a diagram illustrating an example of a user interface representing a results screen showing evaluation results for an answer by a participant within a coaching session, in accordance with some embodiments. A result for a first question 650 is shown, including evaluation scores for talking speed and filler words 652, total content coverage 654, and coverage of expected answer key points 656, including headlines and conversation statements. A button marked "Next Question" 658 allows the participant to move on to the next question to be asked by the virtual coaching agent.

Figure 6D:
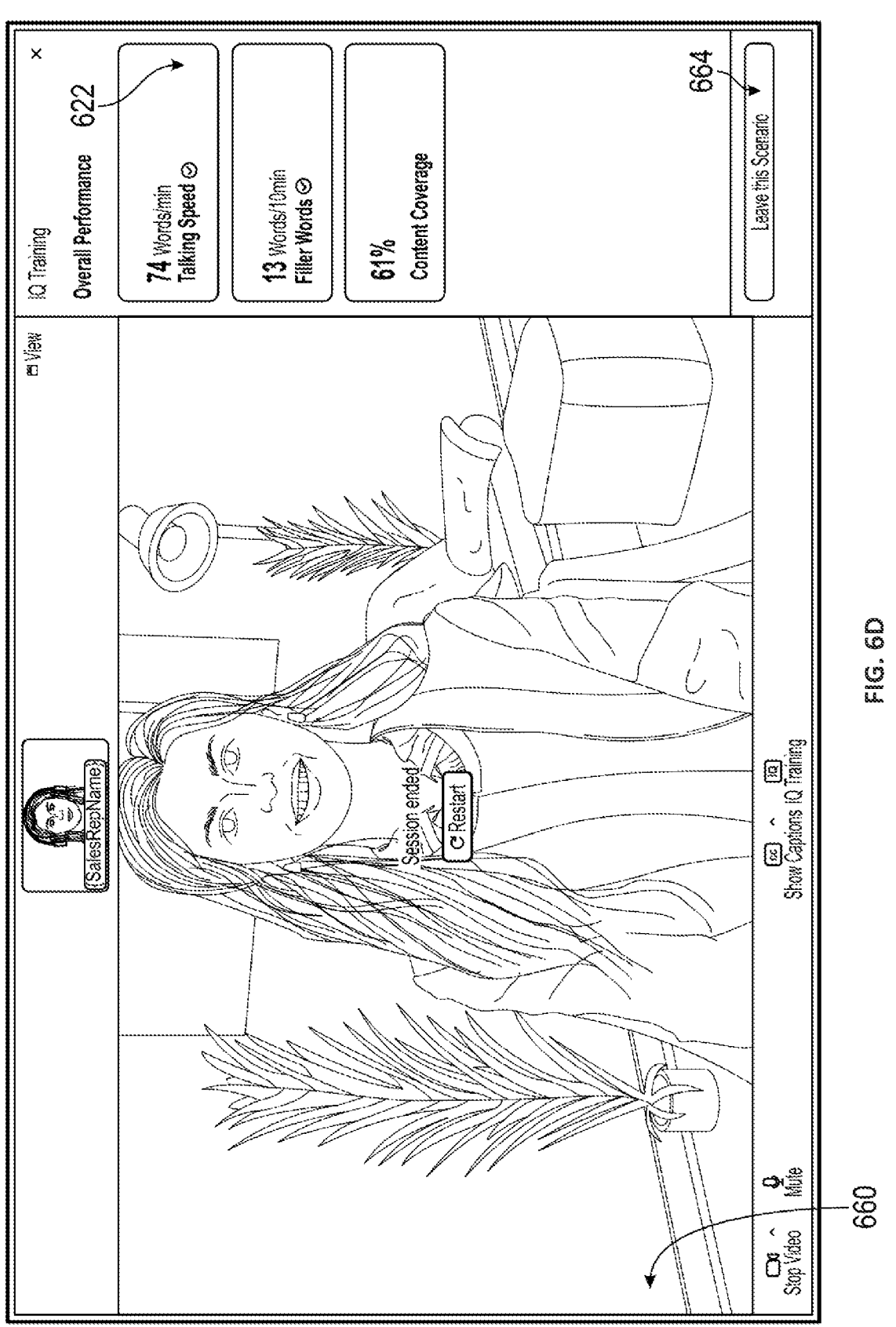
FIG. 6D is a diagram illustrating an example of a user interface representing an overall performance screen for a coaching session completed by a participant, in accordance with some embodiments.

FIG. 6D is a diagram illustrating an example of a user interface representing an overall performance screen for a coaching session completed by a participant, in accordance with some embodiments. A message marked "Session ended" and a button marked "Restart" are provided over the video output of the virtual coaching assistant, providing the participant with an option to restart the coaching session. An overall performance score (i.e., overall evaluation score) 622 is provided, including overall talking speed, filler words, and content coverage scores. The user may additionally leave the coaching session by pressing a button 664 marked "Leave this Scenario".

Figure 7:
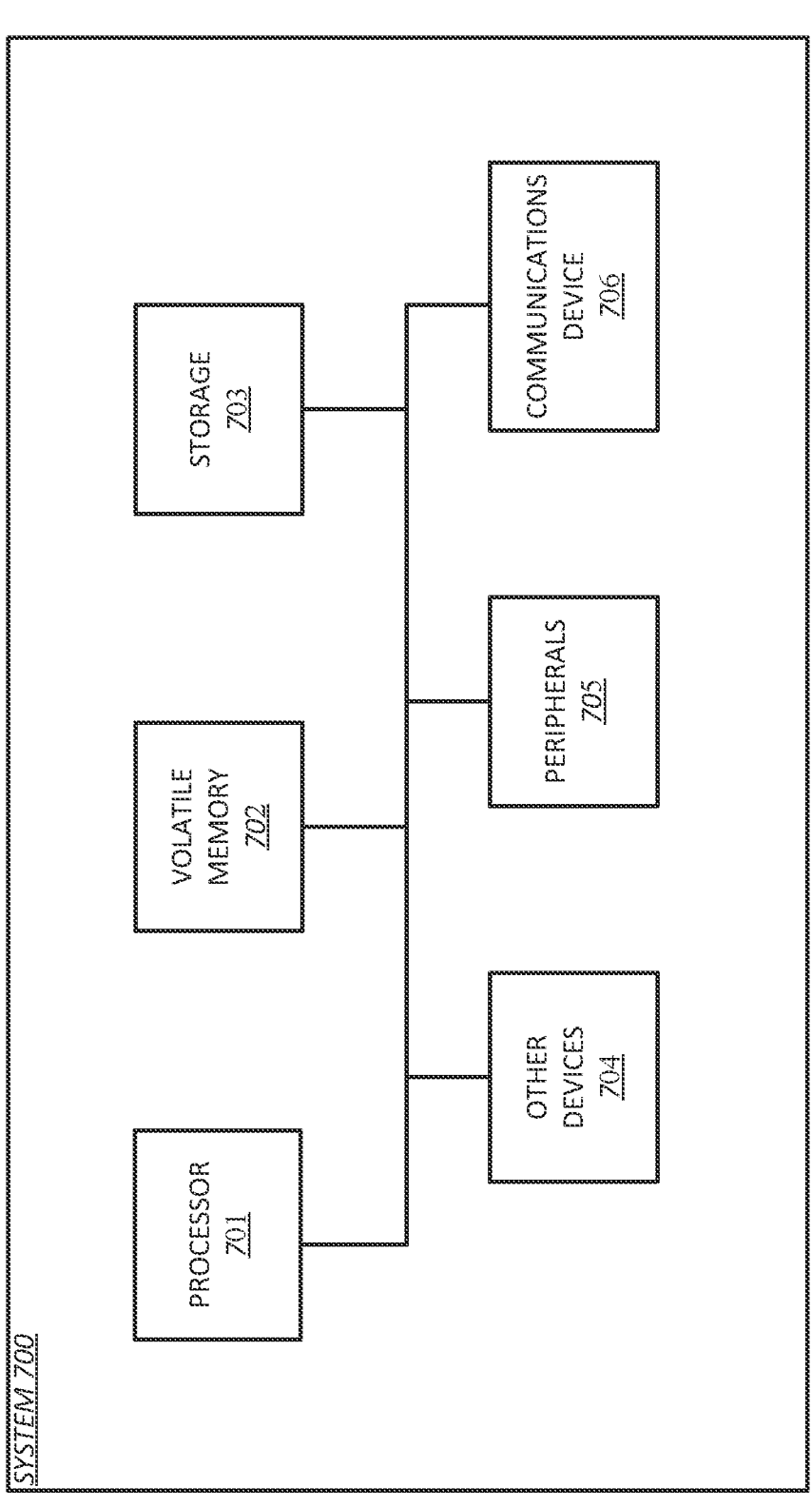
FIG. 7 is a diagram illustrating an exemplary computer that may perform processing in some embodiments.

FIG. 7 is a diagram illustrating an exemplary computer that may perform processing in some embodiments. Exemplary computer 700 may perform operations consistent with some embodiments. The architecture of computer 700 is exemplary. Computers can be implemented in a variety of other ways. A wide variety of computers can be used in accordance with the embodiments herein.

Processor 701 may perform computing functions such as running computer programs. The volatile memory 702 may provide temporary storage of data for the processor 701. RAM is one kind of volatile memory. Volatile memory typically requires power to maintain its stored information. Storage 703 provides computer storage for data, instructions, and/or arbitrary information. Non-volatile memory, which can preserve data even when not powered and including disks and flash memory, is an example of storage. Storage 703 may be organized as a file system, database, or in other ways. Data, instructions, and information may be loaded from storage 703 into volatile memory 702 for processing by the processor 701.

The computer 700 may include peripherals 705. Peripherals 705 may include input peripherals such as a keyboard, mouse, trackball, video camera, microphone, and other input devices. Peripherals 705 may also include output devices such as a display. Peripherals 705 may include removable media devices such as CD-R and DVD-R recorders/players. Communications device 706 may connect the computer 100 to an external medium. For example, communications device 706 may take the form of a network adapter that provides communications to a network. A computer 700 may also include a variety of other devices 704. The various components of the computer 700 may be connected by a connection medium such as a bus, crossbar, or network.

It will be appreciated that the present disclosure may include any one and up to all of the following examples.

Example 1. A method, comprising: receiving transcripts for a plurality of selected meetings from within a communication platform, the meetings being selected for question extraction; extracting, via a question extraction model, a plurality of questions from the transcripts for the selected meetings; extracting, from the plurality of questions, a plurality of expected answers, each expected answer associated with one of the questions; connecting to a coaching session comprising one or more participants using one or more client devices and a virtual coaching agent; transmitting at least a subset of the extracted questions to at least one of the client devices used by at least one of the participants, the extracted questions being transmitted as uttered by the virtual coaching agent; receiving, from the at least one client device, answers to the subset of the extracted questions by the at least one participant; and generating one or more evaluation scores for the at least one participants corresponding to each of the answers, the evaluation scores being based at least in part on the extracted expected answers associated with the subset of the extracted questions.

Example 2. The method of example 1, wherein the plurality of extracted questions and the plurality of expected answers both comprise one or more scenarios, where the extracted questions and answers within each scenario all relate to a common context.

Example 3. The method of example 2, wherein the one or more scenarios and the common context for each scenario are automatically generated based on the content of the questions and expected answers.

Example 4. The method of any of examples 1-3, wherein at least one of the participants of the coaching session was assigned to the coaching session by a user of the communication platform authorized to assign coaching sessions to the participant.

Example 5. The method of any of examples 1-4, wherein at least one of the participants of the coaching session was automatically assigned to the coaching session automatically based on a performance by the participant within one or more communication sessions previously attended by the participant.

Example 6. The method of any of examples 1-5, further comprising: for each received answer from a participant, receiving a transcript of utterances spoken by the participant during the answer, wherein generating the one or more evaluation scores for each of the answers is further based at least in part on comparing the extracted expected answers associated with the subset of the extracted questions to the utterances for the received answer.

Example 7. The method of any of examples 1-6, wherein the answers to the questions by the one or more participants each comprises audio and video of the answering participant, and wherein generating the one or more evaluation scores for each of the answers is further based at least in part on evaluating the style of the audio and video of the answering participant.

Example 8. The method of any of examples 1-7, further comprising: determining an overall evaluation score for the coaching session based on the generated evaluation scores for the answers; and transmitting, to at least the client device, the overall evaluation score for the coaching session.

Example 9. The method of any of examples 1-8, wherein the evaluation scores for each of the answers are transmitted in real time to at least a corresponding client device of the answering participant upon receiving the answer.

Example 10. The method of any of examples 1-9, wherein at least one of the evaluation scores for each question represents a percentage of content coverage for the question, and further comprising: transmitting, to at least the client device in real time upon receiving the answer, the percentage of content coverage for the question.

Example 11. The method of any of examples 1-10, wherein each of the extracted expected answers comprises one or more key points, each of the key points comprising a headline and a conversation sentence.

Example 12. The method of any of examples 1-11, wherein extracting the plurality of questions and extracting the plurality of expected answers both are performed via machine learning (ML) techniques.

Example 13. The method of any of examples 1-12, further comprising: extracting, via a question extraction model, a plurality of expected questions from the transcripts for the selected meetings, the expected questions representing questions the one or more participants may ask the virtual coaching agent.

Example 14. The method of example 13, further comprising: extracting an answer for each of the plurality of expected questions, the answer being associated with the expected question.

Example 15. The method of example 14, further comprising: receiving, from the client device, a question from one of the participants to the virtual coaching agent; determining a similarity match of the question from the participant to an expected question from the plurality of expected questions; and transmitting, to the client device, the answer associated with the expected question, the answer being transmitted as uttered by the virtual coaching agent.

Example 16. The method of any of examples 1-15, wherein the one or more processors are further configured to perform the operation of: prior to transmitting a next question to the client device, determining, via one or more ML techniques, that the answer has terminated.

Example 17. The method of any of examples 1-16, wherein the one or more processors are further configured to perform the operation of: extracting, from audio of the selected meetings, one or more expected tones for one or more answers, each answer comprising audio of one of the participants, and generating the one or more evaluation scores for each of the answers being further based on comparing one or more tones from the audio of the participant in the answer to the one or more expected tones for answers.

Example 18. The method of any of examples 1-17, wherein the one or more processors are further configured to perform the operation of: extracting, from video of the selected meetings, one or more expected visual expressions for answers, each answer comprising video of one of the participants, and generating the one or more evaluation scores for each of the answers being further based on comparing one or more visual expressions from the video of the participant in the answer to the one or more expected visual expressions for answers.

Example 19. A communication system comprising one or more processors configured to perform the operations of: receiving transcripts for a plurality of selected meetings from within a communication platform, the meetings being selected for question extraction; extracting, via a question extraction model, a plurality of questions from the transcripts for the selected meetings; extracting, from the plurality of questions, a plurality of expected answers, each expected answer associated with one of the questions; connecting to a coaching session comprising one or more participants using one or more client devices and a virtual coaching agent; transmitting at least a subset of the extracted questions to at least one of the client devices used by at least one of the participants, the extracted questions being transmitted as uttered by the virtual coaching agent; receiving, from the at least one client device, answers to the subset of the extracted questions by the at least one participant; and generating one or more evaluation scores for the at least one participants corresponding to each of the answers, the evaluation scores being based at least in part on the extracted expected answers associated with the subset of the extracted questions.

Example 20. The communication session of example 19, wherein the plurality of extracted questions and the plurality of expected answers both comprise one or more scenarios, where the extracted questions and answers within each scenario all relate to a common context.

Example 21. The communication session of example 20, wherein the one or more scenarios and the common context for each scenario are automatically generated based on the content of the questions and expected answers.

Example 22. The communication session of any of examples 19-21, wherein at least one of the participants of the coaching session was assigned to the coaching session by a user of the communication platform authorized to assign coaching sessions to the participant.

Example 23. The communication session of any of examples 19-22, wherein at least one of the participants of the coaching session was automatically assigned to the coaching session automatically based on a performance by the participant within one or more communication sessions previously attended by the participant Example 24. The communication session of any of examples 19-23, wherein the one or more processors are further configured to perform the operation of: for each received answer from a participant, receiving a transcript of utterances spoken by the participant during the answer, wherein generating the one or more evaluation scores for each of the answers is further based at least in part on comparing the extracted expected answers associated with the subset of the extracted questions to the utterances for the received answer.

Example 25. The communication session of any of examples 19-24, wherein the answers to the questions by the one or more participants each comprises audio and video of the answering participant, and wherein generating the one or more evaluation scores for each of the answers is further based at least in part on evaluating the style of the audio and video of the answering participant.

Example 26. The communication session of any of examples 19-25, wherein the one or more processors are further configured to perform the operations of: determining an overall evaluation score for the coaching session based on the generated evaluation scores for the answers; and transmitting, to at least the client device, the overall evaluation score for the coaching session.

Example 27. The communication session of any of examples 19-26, wherein the evaluation scores for each of the answers are transmitted in real time to at least a corresponding client device of the answering participant upon receiving the answer.

Example 28. The communication session of any of examples 19-27, wherein at least one of the evaluation scores for each question represents a percentage of content coverage for the question, and further comprising: transmitting, to at least the client device in real time upon receiving the answer, the percentage of content coverage for the question.

Example 29. The communication session of any of examples 19-28, wherein each of the extracted expected answers comprises one or more key points, each of the key points comprising a headline and a conversation sentence.

Example 30. The communication session of any of examples 19-29, wherein extracting the plurality of questions and extracting the plurality of expected answers both are performed via machine learning (ML) techniques.

Example 31. The communication session of any of examples 19-30, wherein the one or more processors are further configured to perform the operation of: extracting, via a question extraction model, a plurality of expected questions from the transcripts for the selected meetings, the expected questions representing questions the one or more participants may ask the virtual coaching agent.

Example 32. The communication session of example 31, wherein the one or more processors are further configured to perform the operation of: extracting an answer for each of the plurality of expected questions, the answer being associated with the expected question.

Example 33. The communication session of example 32, wherein the one or more processors are further configured to perform the operations of: receiving, from the client device, a question from one of the participants to the virtual coaching agent; determining a similarity match of the question from the participant to an expected question from the plurality of expected questions; and transmitting, to the client device, the answer associated with the expected question, the answer being transmitted as uttered by the virtual coaching agent.

Example 34. The communication session of any of examples 19-33, wherein the one or more processors are further configured to perform the operation of: prior to transmitting a next question to the client device, determining, via one or more ML techniques, that the answer has terminated.

Example 35. The communication session of any of examples 19-34, wherein the one or more processors are further configured to perform the operation of: extracting, from audio of the selected meetings, one or more expected tones for one or more answers, each answer comprising audio of one of the participants, and generating the one or more evaluation scores for each of the answers being further based on comparing one or more tones from the audio of the participant in the answer to the one or more expected tones for answers.

Example 36. The communication session of any of examples 19-35, wherein the one or more processors are further configured to perform the operation of: extracting, from video of the selected meetings, one or more expected visual expressions for answers, each answer comprising video of one of the participants, and generating the one or more evaluation scores for each of the answers being further based on comparing one or more visual expressions from the video of the participant in the answer to the one or more expected visual expressions for answers.

Example 37. The communication session of example 36, wherein the one or more processors are further configured to perform the operation of: extracting, from video of the selected meetings, one or more expected visual expressions for answers, each answer comprising video of one of the participants, and generating the one or more evaluation scores for each of the answers being further based on comparing one or more visual expressions from the video of the participant in the answer to the one or more expected visual expressions for answers.

Example 38. A non-transitory computer-readable medium containing instructions, comprising: instructions for receiving transcripts for a plurality of selected meetings from within a communication platform, the meetings being selected for question extraction; instructions for extracting, via a question extraction model, a plurality of questions from the transcripts for the selected meetings; instructions for extracting, from the plurality of questions, a plurality of expected answers, each expected answer associated with one of the questions; instructions for connecting to a coaching session comprising one or more participants using one or more client devices and a virtual coaching agent; instructions for transmitting at least a subset of the extracted questions to at least one of the client devices used by at least one of the participants, the extracted questions being transmitted as uttered by the virtual coaching agent; instructions for receiving, from the at least one client device, answers to the subset of the extracted questions by the at least one participant; and instructions for generating one or more evaluation scores for the at least one participants corresponding to each of the answers, the evaluation scores being based at least in part on the extracted expected answers associated with the subset of the extracted questions.

Example 39. The non-transitory computer-readable medium of example 38, wherein the plurality of extracted questions and the plurality of expected answers both comprise one or more scenarios, where the extracted questions and answers within each scenario all relate to a common context.

Example 40. The non-transitory computer-readable medium of example 39, wherein the one or more scenarios and the common context for each scenario are automatically generated based on the content of the questions and expected answers.

Example 41. The non-transitory computer-readable medium of any of examples 38-40, wherein at least one of the participants of the coaching session was assigned to the coaching session by a user of the communication platform authorized to assign coaching sessions to the participant.

Example 42. The non-transitory computer-readable medium of any of examples 38-41, wherein at least one of the participants of the coaching session was automatically assigned to the coaching session automatically based on a performance by the participant within one or more communication sessions previously attended by the participant.

Example 43. The non-transitory computer-readable medium of any of examples 38-42, further comprising: for each received answer from a participant, receiving a transcript of utterances spoken by the participant during the answer, wherein generating the one or more evaluation scores for each of the answers is further based at least in part on comparing the extracted expected answers associated with the subset of the extracted questions to the utterances for the received answer.

Example 44. The non-transitory computer-readable medium of any of examples 38-43, wherein the answers to the questions by the one or more participants each comprises audio and video of the answering participant, and wherein generating the one or more evaluation scores for each of the answers is further based at least in part on evaluating the style of the audio and video of the answering participant.

Example 45. The non-transitory computer-readable medium of any of examples 38-44, further comprising: determining an overall evaluation score for the coaching session based on the generated evaluation scores for the answers; and transmitting, to at least the client device, the overall evaluation score for the coaching session.

Example 46. The non-transitory computer-readable medium of any of examples 38-45, wherein the evaluation scores for each of the answers are transmitted in real time to at least a corresponding client device of the answering participant upon receiving the answer.

Example 47. The non-transitory computer-readable medium of any of examples 38-46, wherein at least one of the evaluation scores for each question represents a percentage of content coverage for the question, and further comprising: transmitting, to at least the client device in real time upon receiving the answer, the percentage of content coverage for the question.

Example 48. The non-transitory computer-readable medium of any of examples 38-47, wherein each of the extracted expected answers comprises one or more key points, each of the key points comprising a headline and a conversation sentence.

Example 49. The non-transitory computer-readable medium of any of examples 38-48, wherein extracting the plurality of questions and extracting the plurality of expected answers both are performed via machine learning (ML) techniques.

Example 59. The non-transitory computer-readable medium of any of examples 38-49, further comprising: extracting, via a question extraction model, a plurality of expected questions from the transcripts for the selected meetings, the expected questions representing questions the one or more participants may ask the virtual coaching agent.

Example 51. The non-transitory computer-readable medium of example 50, further comprising: extracting an answer for each of the plurality of expected questions, the answer being associated with the expected question.

Example 52. The non-transitory computer-readable medium of example 51, further comprising: receiving, from the client device, a question from one of the participants to the virtual coaching agent; determining a similarity match of the question from the participant to an expected question from the plurality of expected questions; and transmitting, to the client device, the answer associated with the expected question, the answer being transmitted as uttered by the virtual coaching agent.

Example 53. The non-transitory computer-readable medium of any of examples 38-52, wherein the one or more processors are further configured to perform the operation of: prior to transmitting a next question to the client device, determining, via one or more ML techniques, that the answer has terminated Example 54. The non-transitory computer-readable medium of any of examples 38-53, wherein the one or more processors are further configured to perform the operation of: extracting, from audio of the selected meetings, one or more expected tones for one or more answers, each answer comprising audio of one of the participants, and generating the one or more evaluation scores for each of the answers being further based on comparing one or more tones from the audio of the participant in the answer to the one or more expected tones for answers.

Example 55. The non-transitory computer-readable medium of any of examples 38-54, wherein the one or more processors are further configured to perform the operation of: extracting, from video of the selected meetings, one or more expected visual expressions for answers, each answer comprising video of one of the participants, and generating the one or more evaluation scores for each of the answers being further based on comparing one or more visual expressions from the video of the participant in the answer to the one or more expected visual expressions for answers.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:

receiving, by a processing engine integrated with a communication platform, transcripts for a plurality of selected meetings from within a communication platform, the meetings being selected for question extraction;

extracting, via a question extraction model, a plurality of questions from the transcripts for the selected meetings;

extracting, from the plurality of questions, a plurality of expected answers, each expected answer associated with one of the questions, wherein extracting the plurality of expected answers comprises applying a machine learning model to the transcripts to generate, for each question, a set of key points and corresponding conversation sentences representing an expected answer;

connecting to a coaching session comprising one or more participants using one or more client devices and a virtual coaching agent;

transmitting at least a subset of the extracted questions to at least one of the client devices, the extracted questions being transmitted as uttered by the virtual coaching agent;

receiving, from the at least one client device, answers to the subset of the extracted questions by at least one participant of the one or more participants, wherein the answers to the questions by the one or more participants each comprises audio and video of the answering participant, and wherein the virtual coaching agent is represented in another video by a digital avatar;

generating one or more evaluation scores for the at least one participant of the one or more participants corresponding to each of the answers, the evaluation scores being based at least in part on the extracted expected answers associated with the subset of the extracted questions, wherein generating the one or more evaluation scores comprises, for each answer, automatically computing a content coverage score based on a text embedding similarity between a participant's utterances and the extracted expected answer for the corresponding question using the machine learning model, and wherein generating the one or more evaluation scores for each of the answers is further based at least in part on evaluating a style of the audio and video of the answering participant; and transmitting the evaluation score in real time to a corresponding client device.

2. The method of claim 1, wherein the plurality of extracted questions and the plurality of expected answers both comprise one or more scenarios, where the extracted questions and answers within each scenario all relate to a common context.

3. The method of claim 2, wherein the one or more scenarios and the common context for each scenario are automatically generated based on the content of the questions and expected answers.

4. The method of claim 1, wherein at least one of the participants of the coaching session was assigned to the coaching session by a user of the communication platform authorized to assign coaching sessions to the participant.

5. The method of claim 1, wherein at least one of the participants of the coaching session was automatically assigned to the coaching session automatically based on a performance by the participant within one or more communication sessions previously attended by the participant.

6. The method of claim 1, further comprising:

for each received answer from a participant, receiving a transcript of utterances spoken by the participant during the answer, wherein generating the one or more evaluation scores for each of the answers is further based at least in part on comparing the extracted expected answers associated with the subset of the extracted questions to the utterances for the received answer.

7. The method of claim 1, further comprising:

determining an overall evaluation score for the coaching session based on the generated evaluation scores for the answers; and transmitting, to at least the client device, the overall evaluation score for the coaching session.

8. The method of claim 1, wherein the evaluation scores for each of the answers are transmitted in real time to at least a corresponding client device of the answering participant upon receiving the answer.

9. The method of claim 1, wherein at least one of the evaluation scores for each question represents a percentage of content coverage for the question, and further comprising:

transmitting, to at least the client device in real time upon receiving the answer, the percentage of content coverage for the question.

10. The method of claim 1, wherein each of the extracted expected answers comprises one or more key points, each of the key points comprising a headline and a conversation sentence.

11. The method of claim 1, wherein extracting the plurality of questions and extracting the plurality of expected answers both are performed via machine learning (ML) techniques.

12. The method of claim 1, further comprising:

extracting, via a question extraction model, a plurality of expected questions from the transcripts for the selected meetings, the expected questions representing questions the one or more participants may ask the virtual coaching agent.

13. The method of claim 12 further comprising:

extracting, from video of the selected meetings, one or more expected visual expressions for answers.

14. The method of claim 13, further comprising:

receiving, from the client device, a question from one of the participants to the virtual coaching agent;

determining a similarity match of the question from the participant to an expected question from the plurality of expected questions; and transmitting, to the client device, the answer associated with the expected question, the answer being transmitted as uttered by the virtual coaching agent.

15. A communication system comprising one or more processors configured to:

receive, by a processing engine integrated with a communication platform, transcripts for a plurality of selected meetings from within a communication platform, the meetings being selected for question extraction;

extract, via a question extraction model, a plurality of questions from the transcripts for the selected meetings;

extract, from the plurality of questions, a plurality of expected answers, each expected answer associated with one of the questions, wherein extracting the plurality of expected answers comprises applying a machine learning model to the transcripts to generate, for each question, a set of key points and corresponding conversation sentences representing an expected answer;

connect to a coaching session comprising one or more participants using one or more client devices and a virtual coaching agent;

transmit at least a subset of the extracted questions to at least one of the client devices, the extracted questions being transmitted as uttered by the virtual coaching agent;

receive, from the at least one client device, answers to the subset of the extracted questions by at least one participant of the one or more participants, wherein the answers to the questions by the one or more participants each comprises audio and video of the answering participant, and wherein the virtual coaching agent is represented in another video by a digital avatar;

generate one or more evaluation scores for the at least one participant of the one or more participants corresponding to each of the answers, the evaluation scores being based at least in part on the extracted expected answers associated with the subset of the extracted questions, wherein generating the one or more evaluation scores comprises, for each answer, automatically computing a content coverage score based on a text embedding similarity between a participant's utterances and the extracted expected answer for the corresponding question using the machine learning model, and wherein generating the one or more evaluation scores for each of the answers is further based at least in part on evaluating a style of the audio and video of the answering participant; and transmit the evaluation score in real time to a corresponding client device.

16. The communication system of claim 15, wherein the one or more processors are further configured to:

prior to transmitting a next question to the client device, determine, via one or more ML techniques, that the answer has terminated.

17. The communication system of claim 15, wherein the one or more processors are further configured to:

extract, from audio of the selected meetings, one or more expected tones for one or more answers, each answer comprising audio of one of the participants, and generate the one or more evaluation scores for each of the answers being further based on comparing one or more tones from the audio of the participant in the answer to the one or more expected tones for answers.

18. The communication system of claim 15, wherein the one or more processors are further configured to:

extract, from video of the selected meetings, one or more expected visual expressions for answers, each answer comprising video of one of the participants, and generate the one or more evaluation scores for each of the answers being further based on comparing one or more visual expressions from the video of the participant in the answer to the one or more expected visual expressions for answers.

19. A non-transitory computer-readable medium containing instructions, that when executed by one or more processors, cause the one or more processors to perform operations comprising:

receiving, by a processing engine integrated with a communication platform, transcripts for a plurality of selected meetings from within a communication platform, the meetings being selected for question extraction;

extracting, via a question extraction model, a plurality of questions from the transcripts for the selected meetings;

extracting, from the plurality of questions, a plurality of expected answers, each expected answer associated with one of the questions, wherein extracting the plurality of expected answers comprises applying a machine learning model to the transcripts to generate, for each question, a set of key points and corresponding conversation sentences representing an expected answer;

connecting to a coaching session comprising one or more participants using one or more client devices and a virtual coaching agent;

24 transmitting at least a subset of the extracted questions to at least one of the client devices, the extracted questions being transmitted as uttered by the virtual coaching agent;

receiving, from the at least one client device, answers to the subset of the extracted questions by at least one participant of the one or more participants, wherein the answers to the questions by the one or more participants each comprises audio and video of the answering participant, and wherein the virtual coaching agent is represented in another video by a digital avatar;

generating one or more evaluation scores for the at least one participant of the one or more participants corresponding to each of the answers, the evaluation scores being based at least in part on the extracted expected answers associated with the subset of the extracted questions, wherein generating the one or more evaluation scores comprises, for each answer, automatically computing a content coverage score based on a text embedding similarity between a participant's utterances and the extracted expected answer for the corresponding question using the machine learning model, and wherein generating the one or more evaluation scores for each of the answers is further based at least in part on evaluating a style of the audio and video of the answering participant; and transmitting the evaluation score in real time to a corresponding client device.

20. The non-transitory computer-readable medium of claim 19, wherein the plurality of extracted questions and the plurality of expected answers both comprise one or more scenarios, where the extracted questions and answers within each scenario all relate to a common context.

* * * * *